(12) United States Patent
Marchini (10) Patent No.: US 12,154,542 B2
(45) Date of Patent: Nov. 26, 2024

(54) AUDIO TRANSLATOR

(71) Applicant: Spotify AB, Stockholm (SE)

(72) Inventor: Marco Marchini, Paris (FR)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/176,031

(22) Filed: Feb. 28, 2023

(65) Prior Publication Data

US 2023/0282200 A1    Sep. 7, 2023

Related U.S. Application Data

(63) Continuation of application No. 17/197,323, filed on Mar. 10, 2021, now Pat. No. 11,605,369.

(51) Int. Cl.
| | |
|---|---|
| G10L 13/033 | (2013.01) |
| G06N 20/00 | (2019.01) |
| G10L 15/06 | (2013.01) |
| G10L 21/003 | (2013.01) |
| G10L 25/45 | (2013.01) |
| G10L 25/75 | (2013.01) |

(52) U.S. Cl.
CPC ........... *G10L 13/033* (2013.01); *G06N 20/00* (2019.01); *G10L 15/063* (2013.01); *G10L 21/003* (2013.01); *G10L 25/45* (2013.01); *G10L 25/75* (2013.01); *G10L 2015/0631* (2013.01)

(58) Field of Classification Search
CPC .. G10L 13/033; G10L 13/0335; G10L 21/003
See application file for complete search history.

(56) References Cited

U.S. PATENT DOCUMENTS

| | | | |
|---|---|---|---|
| 10,008,193 B1 | 6/2018 | Harvilla | |
| 11,605,369 B2 | 3/2023 | Marchini | |
| 2013/0162649 A1* | 6/2013 | Oshima | G10H 1/0008 345/440 |
| 2019/0103082 A1* | 4/2019 | Ogasawara | G10H 7/008 |
| 2021/0005180 A1 | 1/2021 | Kim | |
| 2021/0043216 A1* | 2/2021 | Wang | G10L 17/18 |
| 2021/0118460 A1 | 4/2021 | Kameoka | |

(Continued)

OTHER PUBLICATIONS

Saito, D., Yamamoto, K., Minematsu, N., & Hirose, K. (2011). One-to-many voice conversion based on tensor representation of speaker space. In Twelfth Annual Conference of the International Speech Communication Association.*

(Continued)

*Primary Examiner* — Bryan S Blankenagel
(74) *Attorney, Agent, or Firm* — McDonnell Boehnen Hulbert & Berghoff LLP (57) ABSTRACT

Audio translation system includes a feature extractor and a style transfer machine learning model. The feature extractor generates for each of a plurality of source voice files one or more source voice parameters encoded as a collection of source feature vectors, and generates for each of a plurality of target voice files one or more target voice parameters encoded as a collection of target feature vectors. The style transfer machine learning model trained on the collection of source feature vectors for the plurality of source voice files and the collection of target feature vectors for the plurality of target voice files to generate a style transformed feature vector.

20 Claims, 9 Drawing Sheets

(56) References Cited

U.S. PATENT DOCUMENTS

| | | |
|---|---|---|
| 2021/0132945 A1 | 5/2021 | Mills |
| 2021/0193160 A1 | 6/2021 | Wang |

OTHER PUBLICATIONS

Defossez, et al. "Sing: Symbol-to-instrument neural generator." Advances in Neural Information Processing Systems 31, 32nd Conference on Neural Information Processing Systems (NIPS, 2018), Montreal, Canada. Oct. 23, 2018., 11 pages. URL http://papers.nips.cc/paper/8118-sing-symbol-to-instrument-neural-generator.pdf.

Arik, Sercan O. et al. "Fast Spectrogram Iinversion using Mmulti-head Convolutional Neural Networks." IEEE Signal Processing Letters, 26(1):94-98, Jan. 2019. doi: 10.1109/LSP. 2018.2880284, 6 pages.

Donahue, Chris, et al. "Adversarial Audio Synthesis." In International Conference on Learning Representations, Feb. 9, 2019, 16 pages. URL https://openreview.net/forum? id=ByMVTsR5KQ.

Wang, Yuxuan, et al., "Tacotron: Towards End-to-End Speech Synthesis." In Interspeech, Apr. 6, 2017, 10 pages.

Engel, Jesse, et al. "GANSynth: Adversarial Neural Audio Synthesis." In International Conference on Learning Representations, Apr. 15, 2019, 17 pages. URL https://openreview.net/forum?id=H1xQVn09FX.

Van Den Oord, Aaron, et al. "Wavenet: A Generative Model for Raw Audio." arXiv preprint arXiv:1609.03499, Sep. 19, 2016, 15 pages.

Mehri, Soroush, et al. "SampleRNN: An Unconditional End-to-End Neural Audio Generation Model." In International Conference on Learning Representations, arXiv preprint arXiv:1612.07837, Feb. 11, 2017, 11 pages.

Kalchbrenner, Nal, et al. "Efficient Neural Audio Synthesis." Proceedings of the 35th International Conference on Machine Learning, Stockholm, Sweden, arXiv preprint arXiv:1802.08435v2, PMLR 80, Jun. 25, 2018, 10 pages.

Blaauw, Merlijn, and Bonada, Jordi. "A Neural Parametric Singing Synthesizer Modeling Timbre and Expression from Natural Songs." Applied Sciences, 7(12):1313, 2017, 23 pages.

Anonymous Authors. "DDSP: Differentiable Digital Signal Processing." In International Conference on Learning Representations, arXiv preprint arXiv:2001.04643 (2020).

Meng, Zhong, et al. "Cycle-Consistent Speech Enhancement," Interspeech, 2018, 5 pages.

Mimura, Masato, et al. "Cross-domain speech recognition using nonparallel corpora with cycle-consistent adversarial networks," IEEE Automatic Speech Recognition and Understanding Workshop (ASRU), 2017, 7 pages.

Sisman, Berrak, et al. "An Overview of Voice Conversion and its Challenges: From Statistical Mmodeling to Deep Learning." arXiv preprint arXiv:2008.03648, Aug. 9, 2020, 27 pages.

Huang, Sicong, e al. "Timbretron: A WaveNet (CycleGAN (CQT (Audio))) Pipeline for Musical Timbre Transfer," In International Conference on Learning Representations, arXiv preprint arXiv:1811.09620, May 2, 2019, 17 pages.

Kaneko, Takuhiro and Kameoka, Hirokazu. "Parallel-Data-Free Voice Conversion Using Cycle-Consistent Adversarial Networks," arXiv preprint arXiv:1711.11293, Dec. 20, 2017, 5 pages.

Fang, Fuming, et al. "High-quality nonparallel voice conversion based on cycle-consistent adversarial network," in 2018 IEEE International Conference on Acoustics, Speech and Signal Processing (ICASSP). IEEE, Apr. 2, 2018, pp. 5279-5283.

Kaneko, Takuhiro and Kameoka, Hirokazu. "CyclegGAN-VC: Non-parallel Voice Conversion Using Cycle-Consistent Adversarial Networks," in 2018 26th European Signal Processing Conference (EUSIPCO). IEEE, 2018, pp. 2100-2104.

Kaneko, Takuhiro "CycleGAN-VC2: Improved CycleGAN-Based Non-parallel Voice Conversion," in ICASSP 2019-2019 IEEE International Conference on Acoustics, Speech and Signal Processing (ICASSP). IEEE, Apr. 9, 2019, pp. 6820-6824.

Kaneko, Takuhiro, et al. "CycleGAN-VC3: Examining and Improving CycleGAN-VCs for Mel-spectrogram Conversion." arXiv preprint arXiv:2010.11672, Oct. 22, 2020. 5 pages.

Serra, Joan, et al. "Blow: a single-scale hyperconditioned flow for non-parallel raw-audio voice conversion." In Advances in Neural Information Processing Systems, 33rd Conference on Neural Information Processing System, Vancouver, Canada (NeurIPS 2019) pp. 6793-6803.

Ardaillon, Luc. "Synthesis and expressive transformation of singing voice." Signal and Image processing. Université Pierre et Marie Curie—Paris VI, 2017. English. NNT : 2017PA066511. tel-01710926v2, 272 pages.

Morise, Masanori, et al. "World: A Vocoder-Based High-Quality Speech Synthesis System for Real-Time Applications," IEICE Trans. Inf. Syst., vol. E99-D, No. 7, pp. 1877-1884, Jul. 2016. https://www.jstage.jst.go.jp/article/transinf/E99.D/7/E99.D_2015EDP7457/_pdf/-char/en.

Luo, Yin-Jyun, et al. "Singing Voice Correction Using Canonical Time Warping." arXiv:1711:08600v1 Nov. 23, 2017, 5 pages.

Yi, et al. "Singing Voice Synthesis Using Deep Autoregressive Neural Networks for Acoustic Modeling," arXiv:1906.08977, v1 Jun. 21, 2019, 5 pages.

Gupta, Chitralekha et al. "Perceptual Evaluation of Singing Quality" In 2017 Asia-Pacific Signal and Information Processing Association Annual Summit and Conference (APSIPA ASC), Dec. 12-15, 2017, pp. 577-586.

Uo, Yin-Jyun, et al. "Toward Expressive Singing Voice Correction: On Perceptual Validity of Evaluation Metrics for Vocal Melody Extraction." arXiv preprint arXiv:2010.12196 Oct. 23, 2020, 5 pages.

Isola, Philip, et al. "Image-to-Image Translation with Conditional Adversarial Networks." arXiv:1611.070043v3, Nov. 26, 2018, 17 pages.

Wager, Sanna, et al. "Deep Autotuner: A Data-Driven Approach to Natural-Sounding Pitch Correction for Singing Voice in Karaoke Performances." arXiv:1902.00956v1 Feb. 3, 2019, 5 pages.

Chandna, Pritish, et al. "WGANSing: A Multi-Voice Singing Voice Synthesizer Based on the Wasserstein-GAN." arXiv preprint arXiv:1903.10729v3 Jun. 19, 2019, 5 pages.

Kawahara, Hideki, et al. Restructuring speech representations using a pitch-adaptive time±frequency smoothing and an instantaneous-frequency-based F0 extraction: Possible role of a repetitive structure in sounds. Speech Communication 27 (1999) 187-207.

Yook, Dongsuk et al. "Voice Conversion Using Conditional CycleGAN." In 2018 International Conference on Computational Science and Computational Intelligence (CSCI). IEEE, 2018, pp. 1460-1461.

\* cited by examiner

AUDIO TRANSLATOR

CROSS REFERENCE TO RELATED APPLICATIONS

This application claims priority to and is a Continuation of U.S. patent application Ser. No. 17/197,323, filed Mar. 10, 2021, which application is hereby incorporated by reference in its entirety herein.

TECHNICAL FIELD

Example aspects described herein relate generally to audio processing technology, and more particularly to performing audio translation.

BACKGROUND

Audio processing technology has revolutionized the sound of popular music. Audio processing software, for example, has been created to allow users to measure and alter (sometimes referred to as "tune") audio samples by altering pitch in vocal and instrumental music recordings. It is also often used to disguise or correct off-key inaccuracies, allowing vocal tracks to be perfectly tuned despite originally being slightly off-pitch. It can also be used to deliberately distort audio (e.g., vocals).

While such audio processing technology offers the ability to alter audio in interesting ways, one area that has been technically challenging is voice conversion. Speaker identity is an important characteristic of human speech. In voice conversion, speaker identity is changed from one speaker to another speaker, while keeping the linguistic content unchanged. Existing mechanisms for performing voice conversion involve multiple speech processing techniques, such as speech analysis, spectral conversion, prosody conversion, speaker characterization, and vocoding.

Achieving an accurate voice translation is technically challenging. So is providing fully automatic voice conversion. Machine learning approaches have enabled the ability to combine data from multiple speakers and perform model adaptation using small amounts of training data as well as joint modeling of timbre and expression from a single corpus of natural songs. However, known approaches would benefit from improved sound quality as they can suffer from over-smoothing in frequency and time and do not consider the salient features of voice in a way that allows for more accurate translation.

CycleGAN is a technique that involves the automatic training of image-to-image translation models without paired examples. The models are trained in an unsupervised manner using a collection of images from the source and target domain that do not need to be related in any way. While CycleGan has shown promising results for use in voice conversion systems, known systems have not been found to adequately provide augmentation specific to singing. This is because typical techniques that analyse singing audio require algorithms that are capable of predicting and controlling both the pitch and duration of audio. However, the audio produced when people sing have more complex rhythms and patterns as compared to speech audio in part because of the noise singing produces. Also, singing training datasets are relatively rare as compared to speech training datasets. As such the problem of augmenting singing is significantly complex.

SUMMARY

The example embodiments described herein meet the above-identified needs by providing methods, systems and computer program products for performing audio translation. In one embodiment, there is provided an audio translation system including a feature extractor and a style transfer machine learning model. The feature extractor is configured to generate for each of a plurality of source voice files one or more source voice parameters encoded as a collection of source feature vectors and, in turn, generate for each of a plurality of target voice files one or more target voice parameters encoded as a collection of target feature vectors. The style transfer machine learning model can be trained on the collection of source feature vectors for the plurality of source voice files and the collection of target feature vectors for the plurality of target voice files to generate a style transformed feature vector.

In some embodiments, the audio translation system further includes a sample audio processor configured to apply the style transformed feature vector on a sample voice file to transform a plurality of voice parameters of the sample voice from a first domain style to a second domain style.

In some embodiments, the audio translation system further includes a sample audio processor configured to generate from a sample voice file a sample tensor identifying the presence of a salient auditory feature over time; crop the sample tensor along a time dimension and a frequency dimension using a sliding window, thereby obtaining at least one cropped sample tensor; apply the style transfer machine learning model on each cropped sample tensor, thereby generating a collection of resulting cropped tensors; stitch the collection of resulting cropped tensors, thereby forming a transformed sample tensor; detect a difference between the sample tensor and the transformed sample tensor; and apply the style transformed feature vector on the sample voice file to transform a plurality of voice parameters of the sample voice from a first domain style to a second domain style based on the difference, thereby generating a transformed sample voice file. The sample audio processor can further be configured to crossfade two sequential resulting cropped tensors. In some embodiments, the sliding window has a fixed size and a fixed hop size.

In some embodiments, the audio translation system further includes a source database configured to store a plurality of source voice files.

In some embodiments, the audio translation system further includes a target database configured to store a plurality of target voice files having a predetermined style. The predetermined style can include, for example, one or more effects, the one or more effects including (i) a vibrato, (ii) a pitch dynamic, (iii) a fundamental frequency (f0) dynamic, (iv) a pitch bend, (v) a slide, (vi) a glissando, or (vii) any combination of (i)-(vi).

In another example embodiment, there is provided a method for performing audio translation, comprising: generating for each of a plurality of source voice files one or more source voice parameters encoded as a collection of source feature vectors; generating for each of a plurality of target voice files one or more target voice parameters encoded as a collection of target feature vectors; and training a style transfer machine learning model on the collection of source feature vectors for the plurality of source voice files and the collection of target feature vectors for the plurality of target voice files to generate a style transformed feature vector.

In some embodiments, the method further comprises applying the style transformed feature vector on a sample voice file to transform a plurality of voice parameters of the sample voice from a first domain style to a second domain style.

In some embodiments, the method further comprises generating from a sample voice file a sample tensor identifying the presence of a salient auditory feature over time; cropping the sample tensor along a time dimension and a frequency dimension using a sliding window, thereby obtaining at least one cropped sample tensor; applying the style transfer machine learning model on each cropped sample tensor, thereby generating a collection of resulting cropped tensors; stitching the collection of resulting cropped tensors, thereby forming a transformed sample tensor; detecting a difference between the sample tensor and the transformed sample tensor; and applying the style transformed feature vector on the sample voice file to transform a plurality of voice parameters of the sample voice from a first domain style to a second domain style based on the difference, thereby generating a transformed sample voice file. In some embodiments, the method further includes crossfading two sequential resulting cropped tensors. And in some embodiments, the sliding window has a fixed size and a fixed hop size.

In some embodiments, the method further comprises storing a plurality of source voice files.

In some embodiments, the plurality of source voice files are not associated to a predetermined style or artist.

In some embodiments, the plurality of source voice files are associated to a predetermined artist.

In some embodiments, each of the plurality of source voice files and each of the plurality of target voice files contains a monophonic voice stem.

In some embodiments, each of the collection of source feature vectors and each of the collection of target feature vectors includes a time dimension and a frequency dimension.

In some embodiments, the method further comprises storing a plurality of target voice files having a predetermined style. In some embodiments, the predetermined style includes one or more effects, the one or more effects including (i) a vibrato, (ii) a pitch dynamic, (iii) a fundamental frequency (f0) dynamic, (iv) a pitch bend, (v) a slide, (vi) a glissando, or (vii) any combination of (i)-(vi).

In some embodiments, the one or more source voice parameters includes any one of a pitch parameter, an energy parameter, a formants parameter, a breathiness parameter, or a roughness parameter.

In some embodiments, the method further comprises the style transfer machine learning model is any one of a image-image translation model or a generative model.

In some embodiments, the method further comprises the sample tensor is generated by extracting a time saliency map including (i) time, (ii) frequency (in a logarithmic scale) and (iii) a channel.

In yet another embodiment there is provided a non-transitory computer-readable medium having stored thereon one or more sequences of instructions for causing one or more processors to perform the methods described herein.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for performing audio translation. As used herein, a singing style is different than a voice type. A voice type may be, for example, baritone or tenor, or soprano or alto. Oftentimes, a voice type may be genetically endowed and determined. On the other hand, a singing style is typically learned. Different singing styles include art music such as opera and Chinese opera, Indian music and religious music styles such as gospel, traditional music styles, world music, jazz, blues, ghazal and popular music styles such as pop, hip hop, rock and electronic dance music. Sometimes the singing style of an artist is unique and easy to recognize. Frank Sinatra and Luciano Pavarotti, for example, each have a singing voice that is unique and relatively easy to recognize. Frank Sinatra, for example, is known for his ability to sing with intimate feeling, flawless legato (connected singing), his careful employment of vibrato, and his cello-like vocal tone. Luciano Pavarotti, on the other hand is known for his intensity, pitch, and bel canto ("beautiful singing") style of singing with a focused voice, and ability to concentrate his sound with both warmth and agility. Generally, aspects of the embodiments described herein apply effects on singing content. More specifically, a singing voice from one singing style, referred to more generally as "a first domain style" (e.g., that of an amateur, or that of a singer with a unique singing style) is applied to a second singing style, referred to more generally herein as "a second domain style" (e.g., that of a different singer with a different unique singing style).

Figure 1:
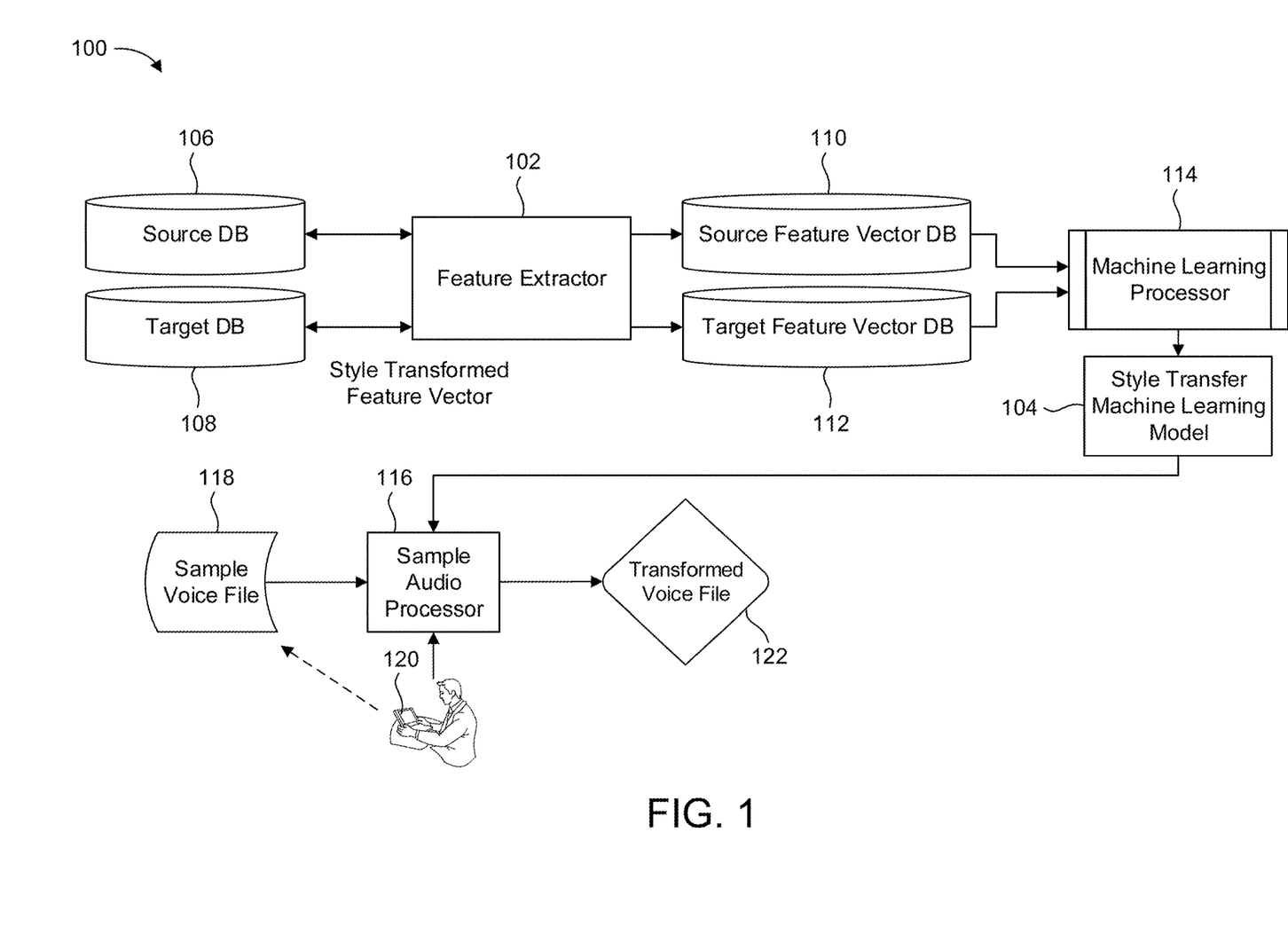
FIG. 1 is an audio translation system in accordance with an example embodiment of the present invention.

FIG. 1 is an audio translation system 100 in accordance with an example embodiment of the present invention. The audio translation system 100 includes a feature extractor 102 and a style transfer machine learning model 104. The feature extractor 102 is configured to generate for each of a plurality of source voice files one or more source voice parameters encoded as a collection of source feature vectors and, in turn, generate for each of a plurality of target voice files one or more target voice parameters encoded as a collection of target feature vectors. The style transfer machine learning model 104 is trained on the collection of source feature vectors for the plurality of source voice files and the collection of target feature vectors for the plurality of target voice files to generate a style transformed feature vector.

To computationally analyze a voice file (e.g., a source voice file or a target voice file), the file is placed in a format that is easy for a machine to work with. In order to analyze a dataset using machine learning techniques, for example, each instance in the dataset must be described by assigning it a set of values that represent certain features, often known as a feature vector. These features have relevance to the knowledge that the machine learning algorithm is trying to uncover. The feature vectors are generated using the feature extractor 102. In an example implementation, the feature extractor 102 is a feature curve generator. The feature curve generator extracts a feature curve for each source voice file. In an example embodiment, the feature curve generator operates as a pitch tracker to generate pitch curves of a wide range of monophonic audio inputs provided by the source voice files. The feature curve generator is thus configured to generate from a source audio file a source feature (e.g., pitch) curve. In an example implementation, the pitch curve is represented as an image. Thus the image is a representation of a collection of feature vectors.

In an example implementation, a feature curve is any one of a pitch curve, an energy curve, a formants curve, a roughness curve, or a transients curve.

In some embodiments, the feature extractor 102 is configured to generate for each of the plurality of source voice files one or more source voice parameters encoded as a collection of source feature vectors and to generate for each of the plurality of target voice files one or more target voice parameters encoded as a collection of target feature vectors. A feature vector can have a time dimension and a feature dimension. For example the feature vector can have a time dimension and a pitch dimension. In another example, the feature vector can include a time dimension and a frequency dimension. The feature vector can be a source feature vector or a target feature vector.

In some embodiments, the audio translation system 100 further includes a source database 106 configured to store a plurality of source voice files. In some embodiments, the audio translation system 100 further includes a target database 108 configured to store a plurality of target voice files. The target database 108 stores target voice files having a predetermined style. One or more databases can be utilized to store the source feature vectors and the target feature vectors. For example, in some embodiments a source feature vector database 110 stores the source feature vectors and a target feature vector database 112 stores the target feature vectors.

In some embodiments, the audio translation system further includes a sample audio processor 116 configured to apply the style transformed feature vector on a sample voice file 118 to transform a plurality of voice parameters of the sample voice from a first domain style to a second domain style. The transformation of the voice parameters of the sample voice contained in the sample voice file 118 from a first domain to a second domain results in a transformed voice file 122.

In some embodiments, audio translation system 100 includes a user interface 120 to set the values of the parameters used by the sample audio processor 116. User interface 120 can also be used to select the sample voice file 118 to be processed by the sample audio processor 116.

In some embodiments, the audio translation system 100 the sample audio processor 116 is configured to generate from the sample voice file 118 a sample tensor identifying the presence of a salient auditory feature over time. The sample tensor is cropped along a time dimension and a frequency dimension using a sliding window. The cropping process results in at least one cropped sample tensor. In turn, the style transfer machine learning model 104 is applied on each cropped sample tensor, generating a collection of resulting cropped tensors. The sample audio processor 116 then stitches the collection of resulting cropped tensors, forming a transformed sample tensor. The sample audio processor 116, in turn, detects a difference between the sample tensor and the transformed sample tensor and applies the style transformed feature vector on the sample voice file to transform a plurality of voice parameters of the sample voice from a first domain style to a second domain style based on the difference, thereby generating the transformed sample voice file 122. The sample audio processor 116 can further be configured to crossfade two sequential resulting cropped tensors. In some embodiments, the sliding window has a fixed size and a fixed hop size. The fixed size and fixed hope size can be preset or set through the user interface 120.

The source voice files can be selected based on a particular use case. In some embodiments, the plurality of source voice files are not associated to a predetermined style or artist. For example, the style transfer machine learning model 104 can be trained by the machine learning processor 114 on variety of singing styles rather than a specific singing style. This can be used, for example where the sample voice having a first domain style such as that of an amateur singer having applied to it a second domain style such as that of a professional singer.

In other embodiments, the plurality of source voice files stored in source database 106 are associated to a predetermined artist.

In some embodiments, each of the plurality of source voice files stored in the source database 106 and each of the plurality of target voice files stored in target database 108 contains a monophonic voice stem (e.g., a single unaccompanied melodic line). In some embodiments, each of the collection of source feature vectors and each of the collection of target feature vectors includes a time dimension and a frequency dimension.

As described above, the audio translation system 100 can include a target database 108 configured to store a plurality of target voice files having a predetermined style. The predetermined style can include, for example, one or more effects, the one or more effects including (i) a vibrato, (ii) a pitch dynamic, (iii) a fundamental frequency (f0) dynamic, (iv) a pitch bend, (v) a slide, (vi) a glissando, or (vii) any combination of (i)-(vi). In some embodiments, the target voice files contain features corresponding to singing of a particular singing style.

In some embodiments, the one or more source voice parameters includes any one of a pitch parameter, an energy parameter, a formants parameter, a breathiness parameter, or a roughness parameter.

In some embodiments, the style transfer machine learning model is any one of a image-image translation model (e.g., a cycleGAN model, a normalizing flow model (e.g., a Glow model)) or a generative model (e.g., an AlignFlow model).

In some embodiments, the sample tensor is generated by extracting a time saliency map including (i) time, (ii) frequency (in a logarithmic scale) and (iii) a channel.

Figure 2:
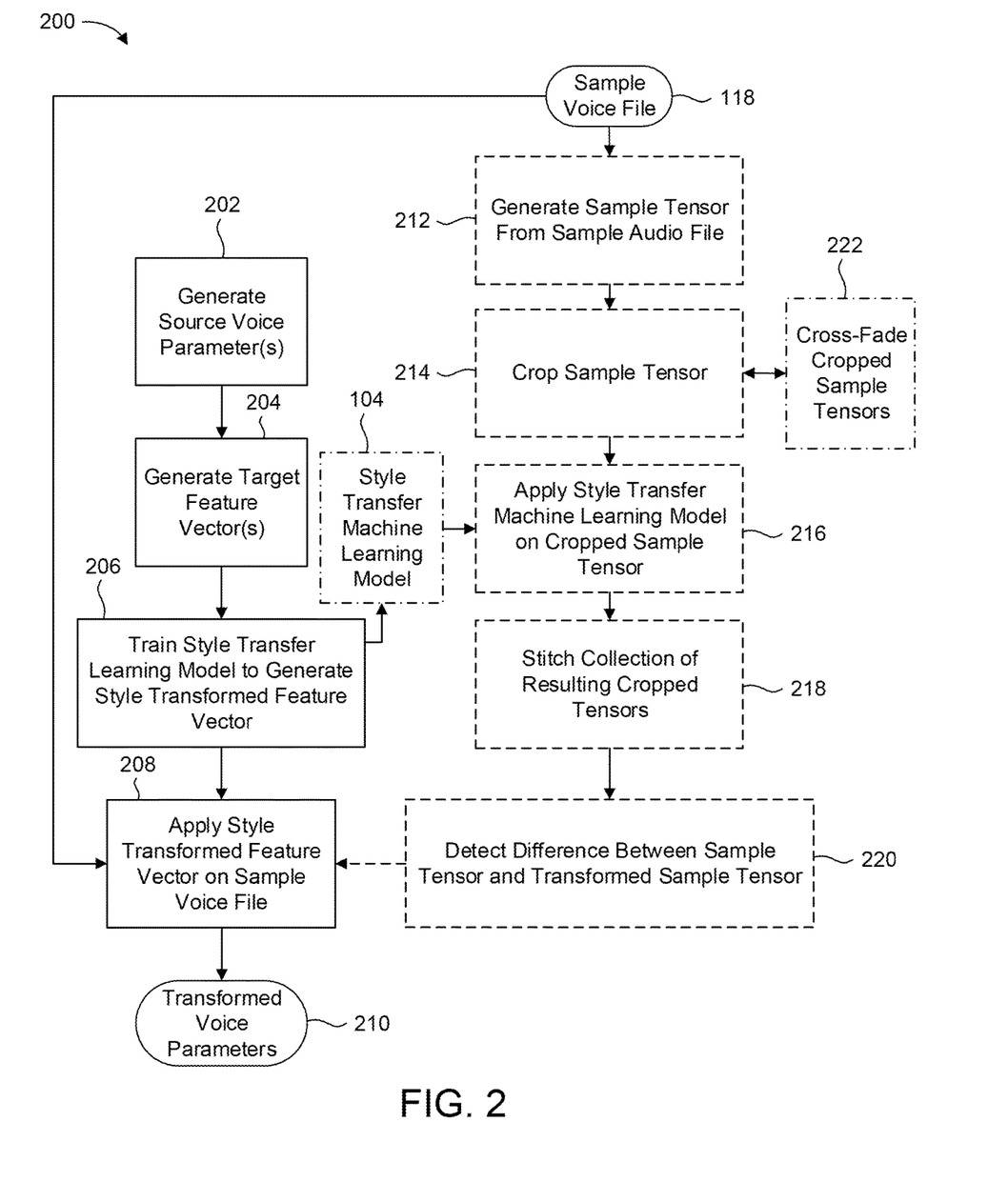
FIG. 2 illustrates a method for performing audio translation according to an example embodiment of the present invention.

FIG. 2 illustrates a method 200 for performing audio translation according to an example embodiment of the present invention. In an example implementation, method 200 is performed by sample audio processor 116 (FIG. 1). As shown in FIG. 2, in step 202, for each source voice file, one or more source voice parameters encoded as a collection of source feature vectors is generated. In step 204, for each target voice file, one or more target voice parameters encoded as a collection of target feature vectors are generated. In turn, a style transfer machine learning model 104 is trained on the collection of source feature vectors for the source voice files and the collection of target feature vectors for the target voice files to generate a style transformed feature vector, as shown in step 206.

In some embodiments, the method further comprises applying the style transformed feature vector on a sample voice file to transform a plurality of voice parameters of the sample voice from a first domain style to a second domain style, resulting in transformed voice parameters 210, as shown in step 208.

In some embodiments, the method further comprises generating from a sample voice file 118 a sample tensor identifying the presence of a salient auditory feature over time, as shown in step 212. At step 214, the sample tensor is cropped along a time dimension and a frequency dimension using a sliding window to obtain at least one cropped sample tensor. At step 216, the style transfer machine learning model 104 is applied on each cropped sample tensor to generate a collection of resulting cropped tensors. In step 218, the collection of resulting cropped tensors are stitched to form a transformed sample tensor. At step 220, a difference between the sample tensor and the transformed sample tensor is detected. Referring again to step 208, the style transformed feature vector is applied on the sample voice file 118 to transform a plurality of voice parameters of the sample voice content in the sample voice file from a first domain style to a second domain style, in this embodiment, based on the difference, thereby generating a transformed voice parameters 210. In an example embodiment, the transform voice parameters 210 are saved in an audio file format (e.g., .wav, .mp3, and the like). In some embodiments, the method further includes crossfading two sequential resulting cropped tensors, as shown in step 222.

In some embodiments, the sliding window has a fixed size and a fixed hop size.

In some embodiments, the plurality of source voice file are not associated to a predetermined style or artist. In some embodiments, the plurality of source voice files are associated to a predetermined artist.

In some embodiments, each of the plurality of source voice files and each of the plurality of target voice files contains a monophonic voice stem. In some embodiments, each of the collection of source feature vectors and each of the collection of target feature vectors includes a time dimension and a frequency dimension.

In some embodiments, the method further comprises storing a plurality of target voice files having a predetermined style. In some embodiments, the predetermined style includes one or more effects, the one or more effects including (i) a vibrato, (ii) a pitch dynamic, (iii) a fundamental frequency (f0) dynamic, (iv) a pitch bend, (v) a slide, (vi) a glissando, or (vii) any combination of (i)-(vi).

In some embodiments, the one or more source voice parameters includes any one of a pitch parameter, an energy parameter, a formants parameter, a breathiness parameter, or a roughness parameter.

In some embodiments, the style transfer machine learning model is any one of a image-image translation model or a generative model.

In some embodiments, the method further comprises the sample tensor is generated by extracting a time saliency map including (i) time, (ii) frequency (in a logarithmic scale) and (iii) a channel.

In yet another embodiment there is provided a non-transitory computer-readable medium having stored thereon one or more sequences of instructions for causing one or more processors to perform the methods described herein.

In some embodiments the training datasets are preprocessed by the feature extractor 102 or a separate audio preprocessor (not shown). For example, a silence removal component of the feature extractor 102 can be used to filter out one or more portions of a source voice file that contains silence. Similarly, the same silence removal component can be used to filter out one or more portions of a target voice file that contains silence. This silence removal can be performed to avoid biasing the training with silence elements.

It should be understood that other preprocessing operations can be performed on the training datasets and still be within the scope of the invention. For example, a volume component of the feature extractor 102 or of a separate audio preprocessor can be used to standardize the volume (also referred to as loudness normalization) of a source voice file and/or target voice file so that the volume of the audio file is the same across a collection of other audio files.

Figure 3A:
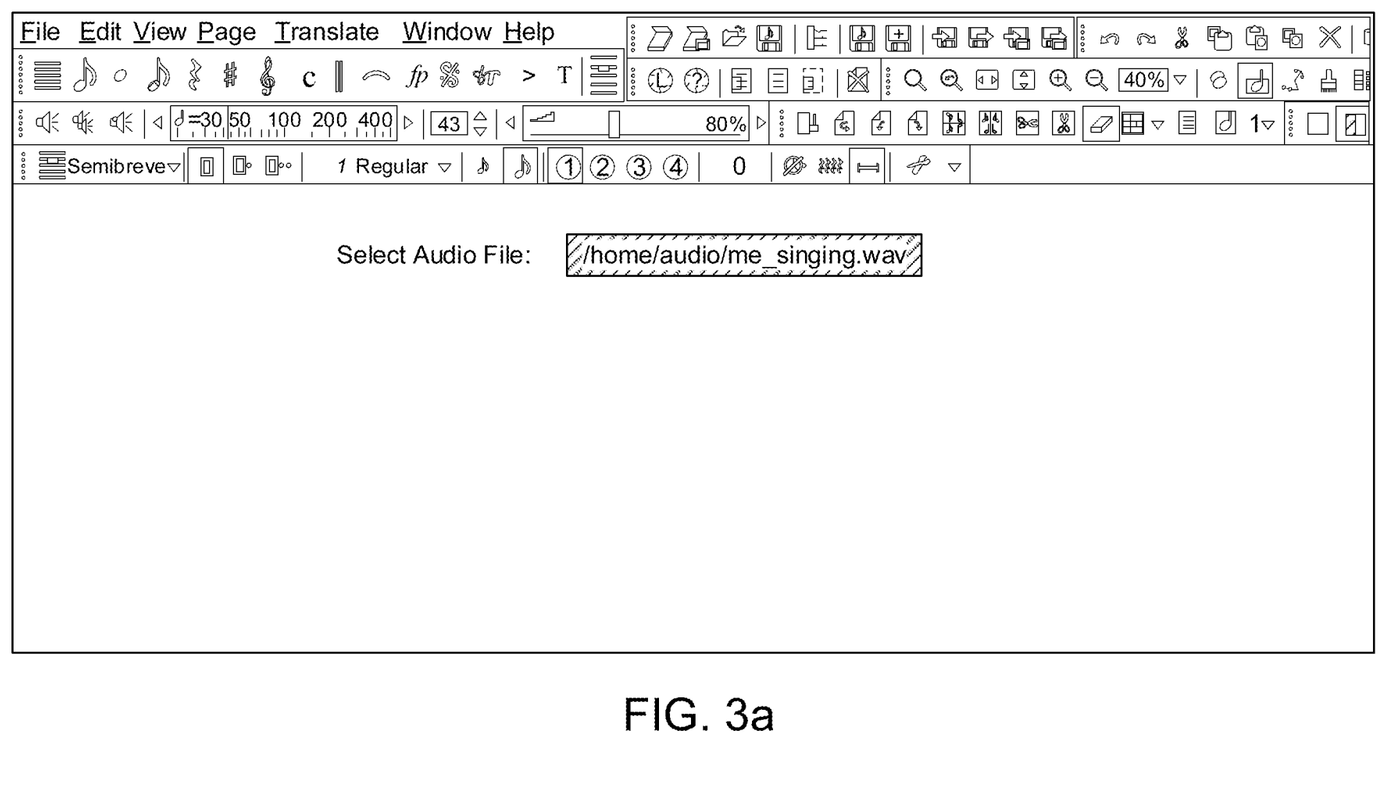
FIG. 3a is an example screenshot of a user interface for performing audio translation according to the example embodiments of the present invention.

FIGS. 3a, 3b, 3c, 3d, 3e, 3f and 3g are example screenshots of a user interface for performing audio translation according to the example embodiments of the present invention. FIG. 3a illustrates an audio file being loaded into memory for processing. In this example embodiment the audio file is a sample voice file named "me_singing.wav".

Figure 3B:
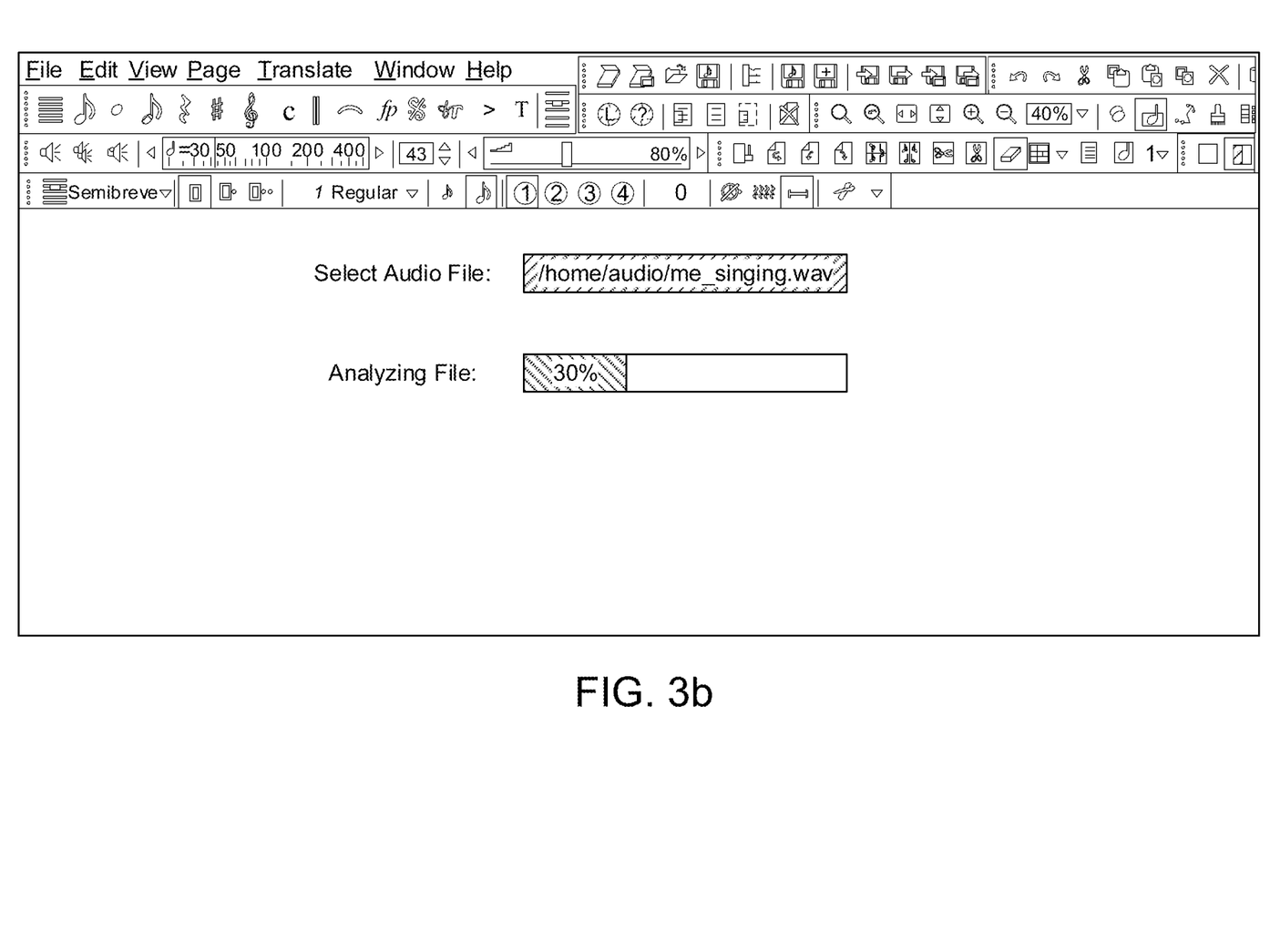
FIG. 3b is an example screenshot of a user interface for performing audio translation according to the example embodiments of the present invention.
Figure 3C:
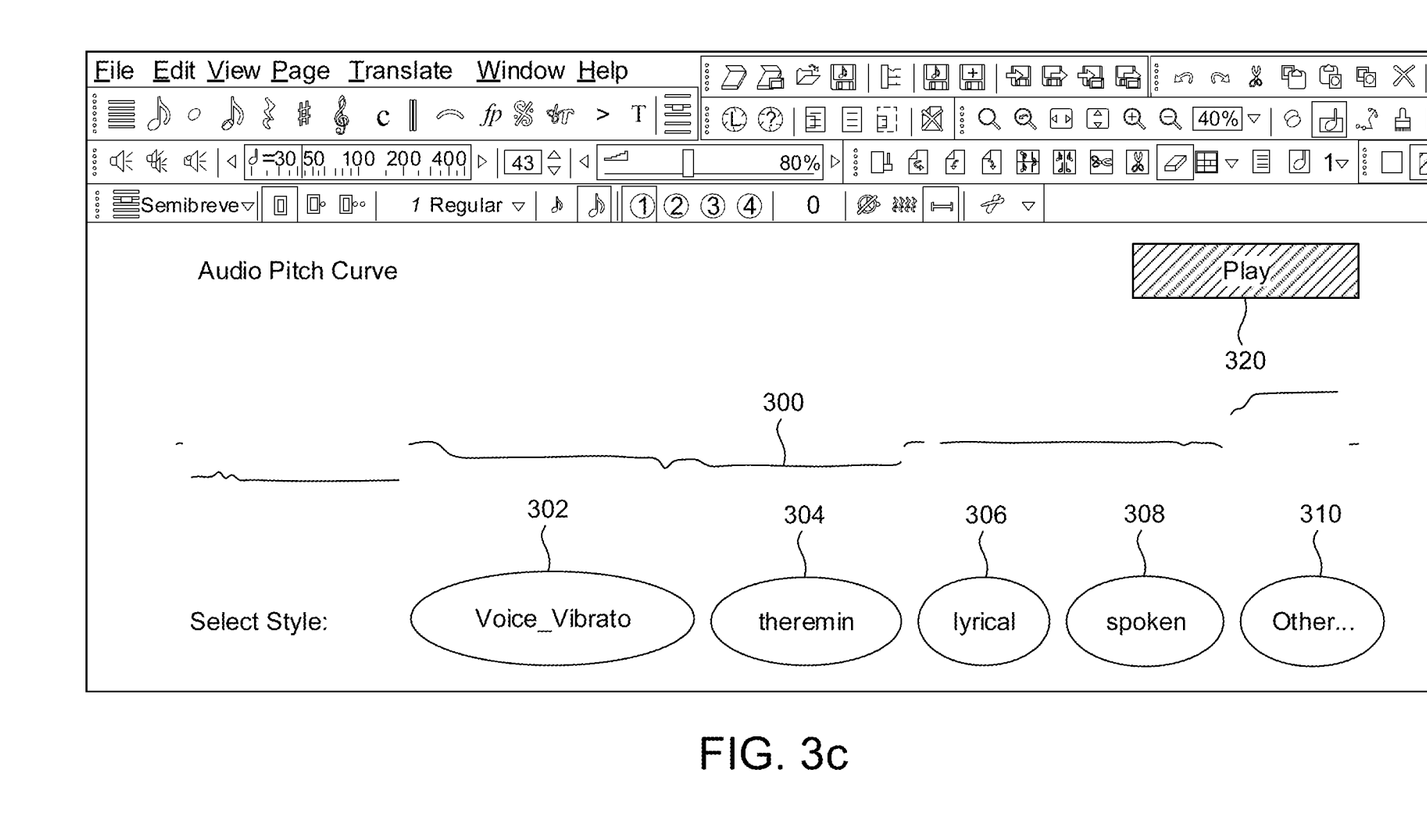
FIG. 3c is an example screenshot of a user interface for performing audio translation according to the example embodiments of the present invention.

FIG. 3b illustrates the sample voice file ("me_singing.wav") being processed to obtain its voice parameters in the form of one or more feature curves. As illustrated in FIG. 3c, the feature curve of the sample voice file is represented as an image. Particularly, the feature curve of the sample voice file is a feature curve of the sample voice file 300. In this example implementation, the feature curve of the sample voice file 300 is a pitch curve, and thus referred to as pitch curve of the sample voice file 300. The pitch curve can be played by selecting the play selector 320 (e.g., a button, a selectable icon, or the like).

As illustrated in FIG. 3c, a particular style can be applied to the pitch curve of the sample voice file 300 to translate the content of the sample voice file from a first domain style to a second domain style. In this example implementation, the available styles can be selected by one of several style selectors corresponding to: a voice_vibrato style 302, a theremin style 304, a lyrical style 306, and a spoken style 308. It should be understood that other styles can be applied to the pitch curve of the sample voice file 300, as represented by other 310. For example, the style of a famous artist can be applied to the pitch curve of the sample voice file 300.

Figure 3D:
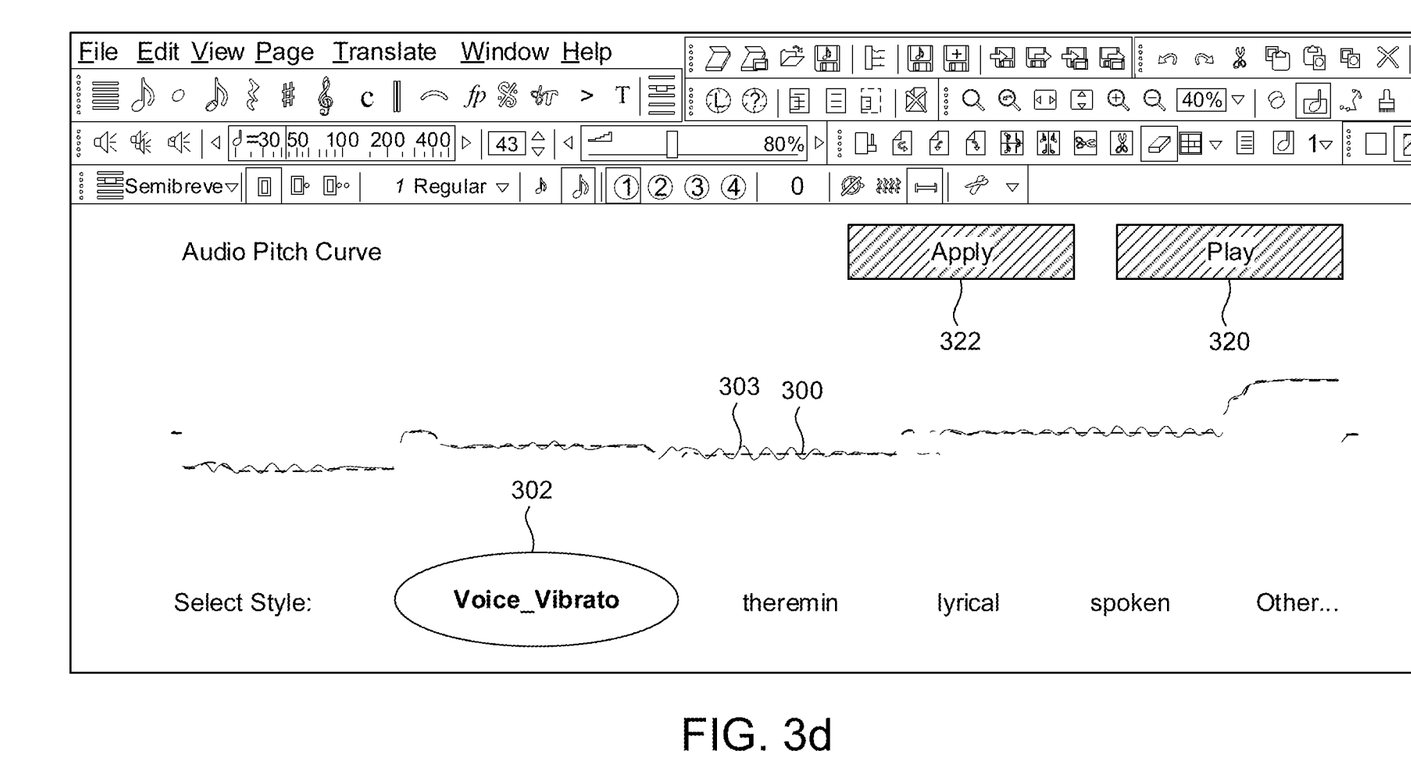
FIG. 3d is an example screenshot of a user interface for performing audio translation according to the example embodiments of the present invention.

FIG. 3d illustrates a voice_vibrato style 302 applied to the pitch curve of the sample voice file 300. As shown in FIG. 3d, the target feature vectors of a voice_vibrato style represented as a voice_vibrato pitch curve 303 are applied to the pitch curve of the sample voice file 300. The voice_vibrato pitch curve 303 can be applied by selecting the "Apply" selector 322. In turn, the play selector 320 can be selected to play the voice_vibrato pitch curve 303 applied to the pitch curve of the sample voice file 300.

Figure 3E:
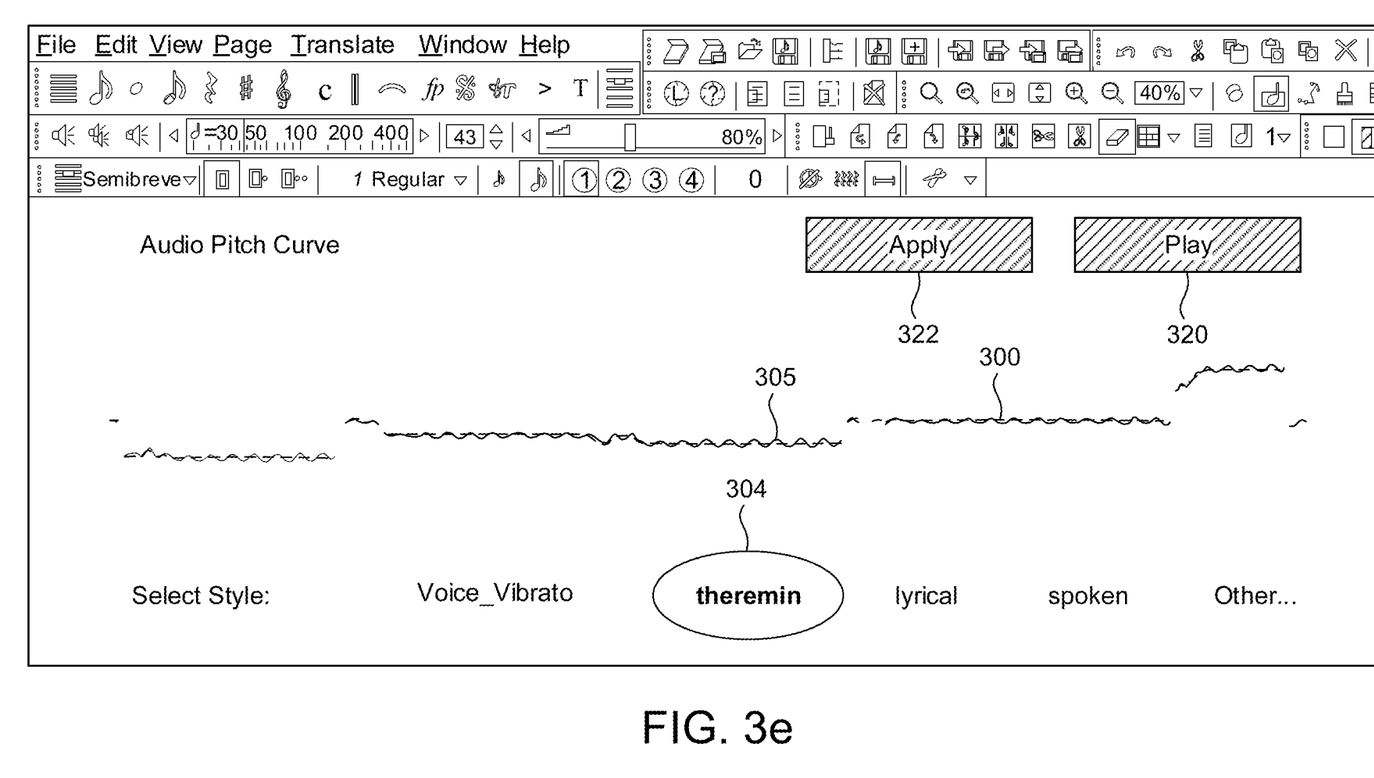
FIG. 3e is an example screenshot of a user interface for performing audio translation according to the example embodiments of the present invention.

FIG. 3e illustrates a theremin style 304 applied to the pitch curve of the sample voice file 300. As shown in FIG. 3e, the target feature vectors of a theremin style represented as a theremin pitch curve 305 are applied to the pitch curve of the sample voice file 300. The theremin pitch curve 305 can be applied by selecting the "Apply" selector 322. In turn, the play selector 320 can be selected to play the theremin pitch curve 305 applied to the pitch curve of the sample voice file 300.

Figure 3F:
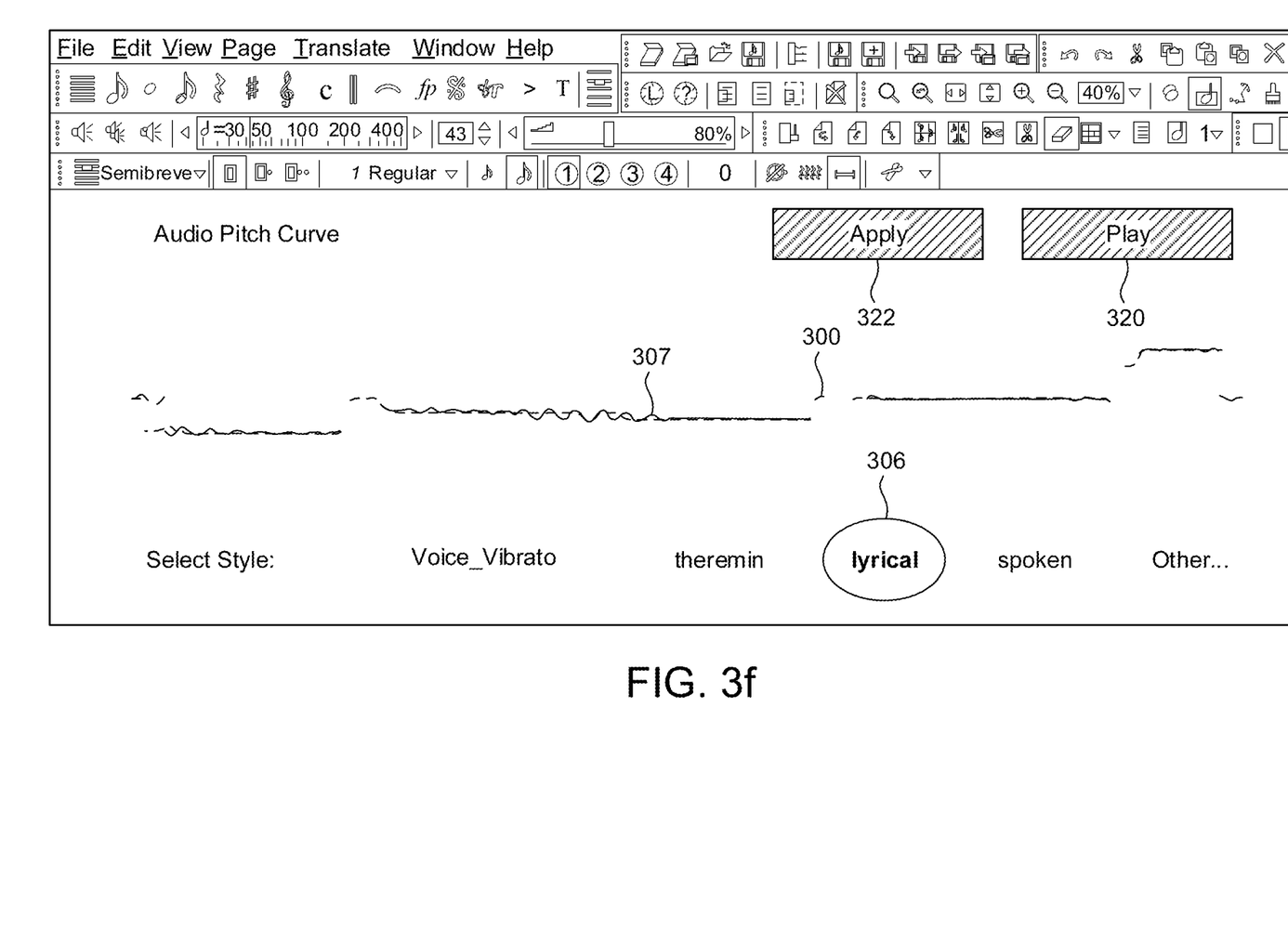
FIG. 3f is an example screenshot of a user interface for performing audio translation according to the example embodiments of the present invention.

FIG. 3f illustrates a lyrical style 306 applied to the pitch curve of the sample voice file 300. As shown in FIG. 3f, the target feature vectors of a lyrical style represented as a lyrical pitch curve 307 are applied to the pitch curve of the sample voice file 300. The lyrical pitch curve 307 can be applied by selecting the "Apply" selector 322. In turn, the play selector 320 can be selected to play the lyrical pitch curve 307 applied to the pitch curve of the sample voice file 300.

Figure 3G:
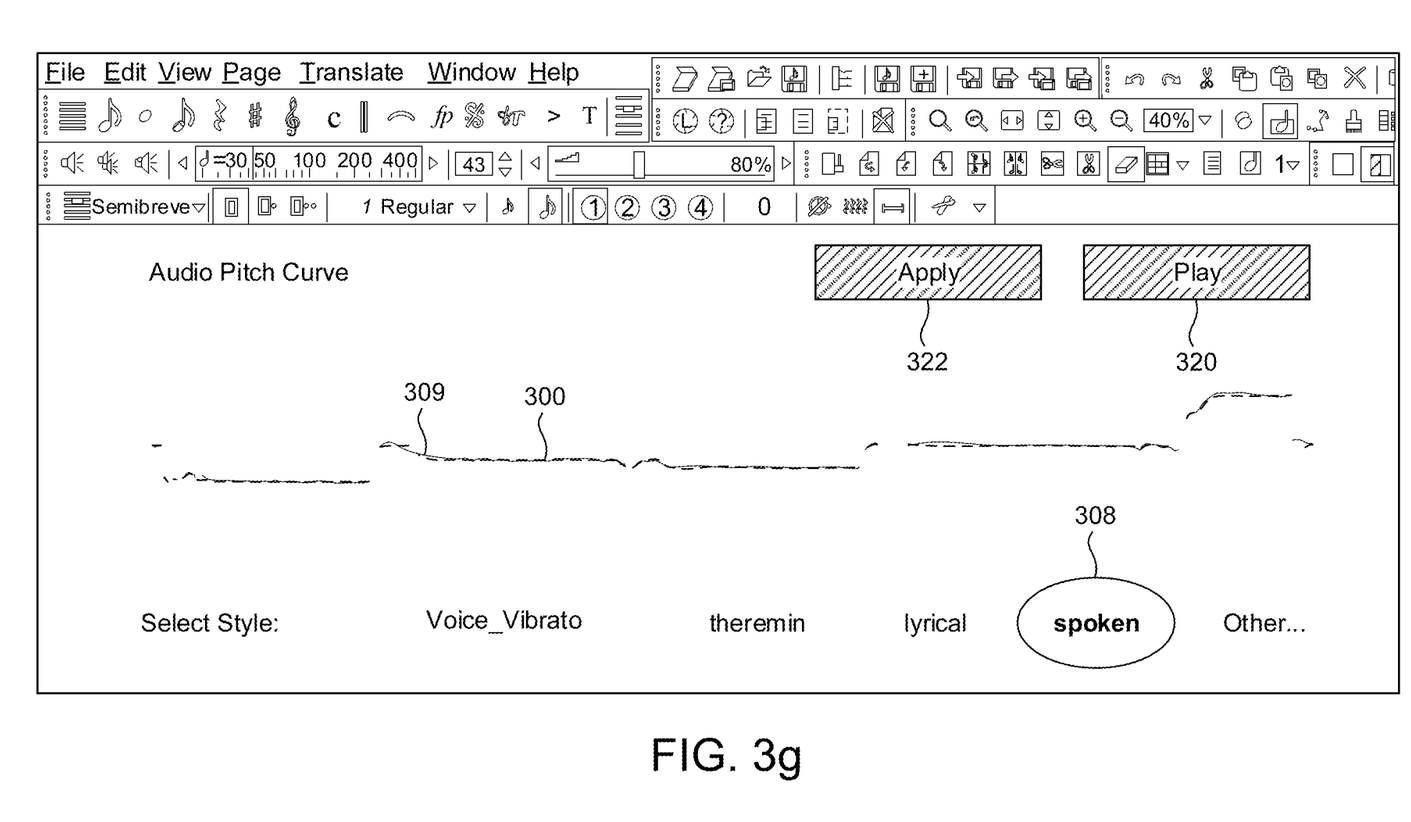
FIG. 3g is an example screenshot of a user interface for performing audio translation according to the example embodiments of the present invention.

FIG. 3g illustrates a spoken style 308 applied to the pitch curve of the sample voice file 300. As shown in FIG. 3e, the target feature vectors of a spoken style represented as a spoken pitch curve 309 are applied to the pitch curve of the sample voice file 300. The spoken pitch curve 309 can be applied by selecting the "Apply" selector 322. In turn, the play selector 320 can be selected to play the spoken pitch curve 309 applied to the pitch curve of the sample voice file 300.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Android, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for performing audio translation, the method comprising:
   receiving a sample voice file;
   displaying one or more feature curves of the sample voice file on a user interface;
   displaying a plurality of styles;
   receiving a selected style from the plurality of styles;
   generating, from the sample voice file, a sample tensor identifying the presence of a salient auditory feature over time;
   cropping the sample tensor along a time dimension and a frequency dimension using a sliding window, thereby obtaining at least one cropped sample tensor;
   applying a machine learning model on each cropped sample tensor of the at least one cropped sample tensor, thereby generating a collection of resulting cropped tensors;
   stitching the collection of resulting cropped tensors, thereby forming a transformed sample tensor;
   translating content of the sample voice file from a first domain style to a second domain style based on an application of one or more feature vectors of the selected style to the one or more feature curves, wherein translating the content of the sample voice file from the first domain style to the second domain style is based on a difference between the sample tensor and the transformed sample tensor; and
   displaying a representation of translated content of the sample voice file in the second domain style on the user interface.

2. The method of claim 1, further comprising: analyzing the sample voice file to obtain one or more voice parameters that include the one or more feature curves.

3. The method of claim 1, further comprising:
   receiving a second selected style;
   translating the content of the sample voice file from the second domain style to a third domain style based on an application of one or more feature vectors of the second selected style to the one or more feature curves, thereby forming second translated content; and
   displaying the second translated content of the sample voice file in the third domain style on the user interface.

4. The method of claim 1, wherein the one or more feature curves includes a pitch curve.

5. The method of claim 1, wherein the selected style is a lyrical style, a theremin style, or a voice vibrato style.

6. The method of claim 1, wherein displaying the representation of the translated content includes displaying one or more translated feature curves associated with the translated content, and wherein the one or more translated feature curves associated with the translated content includes a selected style feature curve applied to the one or more feature curves of the sample voice file.

7. The method of claim 1, further comprising: initiating, by the user interface, playback of the translated content.

8. A non-transitory computer-readable medium having stored thereon one or more sequences of instructions for causing one or more processors to perform:
   receiving a sample voice file;
   displaying one or more feature curves of the sample voice file on a user interface;
   displaying a plurality of styles;
   receiving a selected style from the plurality of styles;
   generating, from the sample voice file, a sample tensor identifying the presence of a salient auditory feature over time;
   cropping the sample tensor along a time dimension and a frequency dimension using a sliding window, thereby obtaining at least one cropped sample tensor;
   applying a machine learning model on each cropped sample tensor of the at least one cropped sample tensor, thereby generating a collection of resulting cropped tensors;
   stitching the collection of resulting cropped tensors, thereby forming a transformed sample tensor;
   translating content of the sample voice file from a first domain style to a second domain style based on an application of one or more feature vectors of the selected style to the one or more feature curves, wherein translating the content of the sample voice file from the first domain style to the second domain style is based on a difference between the sample tensor and the transformed sample tensor; and
   displaying a representation of translated content of the sample voice file in the second domain style on the user interface.

9. The non-transitory computer-readable medium according to claim 8, wherein the one or more processors are further caused to perform: analyzing the sample voice file to obtain one or more voice parameters that include the one or more feature curves.

10. The non-transitory computer-readable medium according to claim 8, wherein the one or more processors are further caused to perform:
    receiving a second selected style;
    translating the content of the sample voice file from the second domain style to a third domain style based on an application of one or more feature vectors of the second selected style to the one or more feature curves, thereby forming second translated content; and
    displaying the second translated content of the sample voice file in the third domain style on the user interface.

11. The non-transitory computer-readable medium according to claim 8, wherein the one or more feature curves includes a pitch curve.

12. The non-transitory computer-readable medium according to claim 8, wherein the selected style is a lyrical style, a theremin style, or a voice vibrato style.

13. The non-transitory computer-readable medium according to claim 8, wherein displaying the representation of the translated content includes displaying one or more translated feature curves associated with the translated content, and wherein the one or more translated feature curves associated with the translated content includes a selected style feature curve applied to the one or more feature curves of the sample voice file.

14. The non-transitory computer-readable medium according to claim 8, wherein the one or more processors are further caused to perform: initiating, by the user interface, playback of the translated content.

15. A system for audio translation, the system comprising:
    a user interface; and
    a sample audio processor configured to:
    receive a sample voice file;
    display one or more feature curves of the sample voice file on the user interface;
    display a plurality of styles;
    receive a selected style from the plurality of styles;
    generate, from the sample voice file, a sample tensor identifying the presence of a salient auditory feature over time;

crop the sample tensor along a time dimension and a frequency dimension using a sliding window, thereby obtaining at least one cropped sample tensor;

apply a machine learning model on each cropped sample tensor of the at least one cropped sample tensor, thereby generating a collection of resulting cropped tensors;

stitch the collection of resulting cropped tensors, thereby forming a transformed sample tensor;

translate content of the sample voice file from a first domain style to a second domain style based on an application of one or more feature vectors of the selected style to the one or more feature curves, wherein the sample audio processor translates the content of the sample voice file from the first domain style to the second domain style based on a difference between the sample tensor and the transformed sample tensor; and display a representation of translated content of the sample voice file in the second domain style on the user interface.

16. The system of claim 15, wherein the sample audio processor is further configured to: analyze the sample voice file to obtain one or more voice parameters that include the one or more feature curves.

17. The system of claim 15, wherein the sample audio processor is further configured to:

receive a second selected style;

translate the content of the sample voice file from the second domain style to a third domain style based on an application of one or more feature vectors of the second selected style to the one or more feature curves, thereby forming second translated content; and display the second translated content of the sample voice file in the third domain style on the user interface.

18. The system of claim 15, wherein the one or more feature curves includes a pitch curve.

19. The system of claim 15, wherein displaying the representation of the translated content includes displaying one or more translated feature curves associated with the translated content, and wherein the one or more translated feature curves associated with the translated content includes a selected style feature curve applied to the one or more feature curves of the sample voice file.

20. The system of claim 15, wherein the sample audio processor is further configured to: cause the user interface to initiate playback of the translated content.

* * * * *